United States Patent
Morris

(10) Patent No.: US 8,140,289 B2
(45) Date of Patent: Mar. 20, 2012

(54) NETWORK-CENTRIC PROCESSING

(75) Inventor: Timothy R. Morris, Fort Wayne, IN (US)

(73) Assignee: Raytheon Company, Waltham, MA (US)

( * ) Notice: Subject to any disclaimer, the term of this patent is extended or adjusted under 35 U.S.C. 154(b) by 674 days.

(21) Appl. No.: 12/256,654

(22) Filed: Oct. 23, 2008

(65) Prior Publication Data

US 2009/0113028 A1  Apr. 30, 2009

Related U.S. Application Data

(60) Provisional application No. 60/982,479, filed on Oct. 25, 2007.

(51) Int. Cl.
*G06F 19/00* (2011.01)

(52) U.S. Cl. ........ 702/108; 434/265; 434/219; 434/118; 701/1; 701/3; 701/16; 709/217; 709/227; 703/21; 379/221.08; 379/221.09; 379/221.1

(58) Field of Classification Search .......... 702/108; 714/32, 42, E11.193, E11.202; 434/265; 607/5; 701/1, 3, 14, 16; 709/217, 227; 705/7, 705/8, 9, 10; 703/2, 13, 21, 23, 24; 379/221.08, 379/221.09, 221.1, 221.12

See application file for complete search history.

(56) References Cited

U.S. PATENT DOCUMENTS

| | | | | |
|---|---|---|---|---|
| 5,023,791 | A * | 6/1991 | Herzberg et al. | 701/35 |
| 5,260,874 | A * | 11/1993 | Berner et al. | 701/33 |
| 5,457,463 | A * | 10/1995 | Vencel et al. | 342/169 |
| 6,504,923 | B1 * | 1/2003 | Swale | 379/221.09 |
| 6,636,721 | B2 * | 10/2003 | Threadgill et al. | 455/12.1 |
| 6,790,041 | B2 * | 9/2004 | Fountain | 434/30 |
| 6,965,816 | B2 * | 11/2005 | Walker | 701/16 |
| 7,092,867 | B2 * | 8/2006 | Huang et al. | 703/21 |
| 7,231,356 | B1 | 6/2007 | Ward et al. | |
| 7,259,693 | B2 * | 8/2007 | Miller et al. | 340/945 |
| 7,302,474 | B2 * | 11/2007 | Szucs et al. | 709/217 |
| 7,607,135 | B2 * | 10/2009 | Grumann | 719/310 |
| 7,668,632 | B2 * | 2/2010 | Vian et al. | 701/29 |
| 7,904,527 | B2 * | 3/2011 | Sarma | 709/217 |
| 2003/0005024 | A1 * | 1/2003 | Grumann | 709/102 |
| 2003/0074606 | A1 * | 4/2003 | Boker | 714/42 |
| 2003/0093187 | A1 * | 5/2003 | Walker | 701/1 |
| 2005/0187677 | A1 * | 8/2005 | Walker | 701/16 |
| 2006/0112119 | A1 * | 5/2006 | Vian et al. | 707/101 |
| 2006/0202033 | A1 | 9/2006 | Campero et al. | |
| 2006/0206347 | A1 * | 9/2006 | Chen | 705/1 |
| 2006/0276201 | A1 * | 12/2006 | Dupray | 455/456.1 |
| 2007/0288208 | A1 * | 12/2007 | Grigsby et al. | 703/2 |
| 2008/0228041 | A1 * | 9/2008 | Horrigan | 600/300 |

(Continued)

OTHER PUBLICATIONS

U.S. Appl. No. 60/962,596.*

(Continued)

*Primary Examiner* — Carol Tsai

(74) *Attorney, Agent, or Firm* — Daly, Crowley, Mofford & Durkee, LLP

(57) ABSTRACT

In one aspect, a network-centric processing (NCP) system includes sensors configured to monitor activities associated with testing of an asset, a first system configured to provide the testing on the asset, a second system configured to provide training of personnel using the asset, a third system configured to record problems associated with the testing and the training of the asset as input for an acquisition process and a network connected to the first system, the second system, the third system and the sensors.

17 Claims, 6 Drawing Sheets

U.S. PATENT DOCUMENTS

| | | | |
|---|---|---|---|
| 2009/0035740 A1* | 2/2009 | Reed et al. | 434/265 |
| 2010/0070445 A1* | 3/2010 | Vian et al. | 706/15 |
| 2010/0076630 A1* | 3/2010 | Vian et al. | 701/14 |
| 2010/0218044 A1* | 8/2010 | Roblett et al. | 714/32 |

OTHER PUBLICATIONS

Notification of Transmittal of the International Search Report and the Written Opinion of the International Searching authority, or the Declaration; PCT/US 08/80905 dated Apr. 15, 2009.

Written Opinion of the International Searching Authority; PCT/US 08/80905 dated Apr. 15, 2009.

Notification Concerning Transmittal of International Preliminary Report on Patentability (Chapter 1 of the Patent Cooperation Treaty), PCT/US2008/080905, dated May 6, 2010, 2 pages.

Written Opinion of the International Searching Authority, PCT/US2008/080905, dated May 6, 2010, 4 pages.

* cited by examiner

NETWORK-CENTRIC PROCESSING

RELATED APPLICATIONS

This application claims priority to Provisional Application Ser. No. 60/982,479 filed on Oct. 25, 2007 and titled "METHODS AND APPARATUS FOR NETWORKED URBAN OPERATIONS TEST BED FRAMEWORK," which is incorporated herein in its entirety.

BACKGROUND

A research, development, test and evaluation (RDT&E) process involves, as its name implies, research, development, test and evaluation of a system to solve a need. For example, a user has need for an aircraft that has certain operational characteristics to meet a particular need (e.g., a military need, a commercial need and so forth). Research is performed to determine a best or optimal solution and an aircraft is developed that includes the possible solution. The developed aircraft is tested and evaluated to determine if it meets the certain operational characteristics desired by the user.

An acquisition process involves acquiring systems and/or services. Using the previous example, the acquisition process involves acquiring the aircraft that meets the certain operational characteristics desired by the user, for example. A training process involves training personnel to use the acquired system. Again, using the first example, the training process involves, for example, the training of personnel on the acquired aircraft.

SUMMARY

In one aspect, a network-centric processing (NCP) system includes sensors configured to monitor activities associated with testing of an asset, a first system configure to provide the testing on the asset, a second system configured to provide training of personnel using the asset, a third system configured to record problems associated with the testing and the training of the asset as input for an acquisition process and a network connected to the first system, the second system, the third system and the sensors.

In another aspect, a method of network centric processing includes processing data from sensors configured to monitor activities associated with testing of an asset, processing data from a first system configured to provide the testing on the asset, processing data from a second system configured to provide training of personnel using the asset and processing data from a third system configured to record problems associated with the testing and the training of the asset as input for an acquisition process. A network connects the first system, the second system, the third system and the sensors.

In a further aspect, an article includes a machine-readable medium that stores executable instructions to provide a network-centric process. The instructions cause a machine to process data from sensors configured to monitor activities associated with testing of an asset, process data from a first system configured to provide the testing on the asset, process data from a second system configured to provide training of personnel using the asset and process data from a third system configured to record problems associated with the testing and the training of the asset as input for an acquisition process. A network connects the first system, the second system, the third system and the sensors.

DETAILED DESCRIPTION

Figure 1:
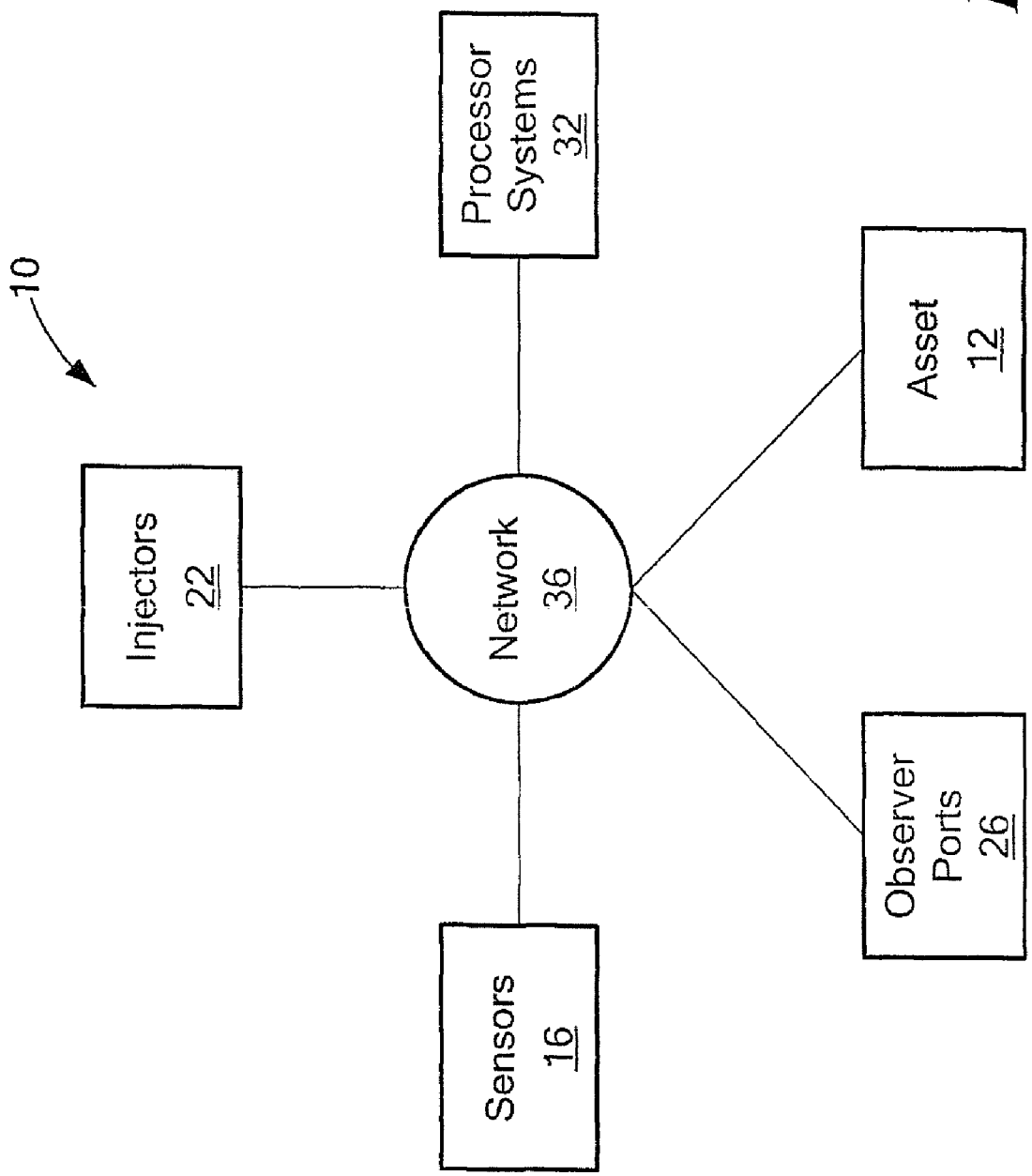
FIG. 1 is a block diagram of a network-centric processing (NCP) system.

Prior art approaches to research, development, test and evaluation (RDT&E), acquisition and training were separate and distinct processes that did not overlap and were also known as stove-piped processes. Likewise the systems that supported these processes were also stove-piped. Described herein is a network-centric processing (NCP) system (e.g., an NCP system 10 (FIG. 1)), that integrates the processes of RDT&E, acquisition and training to provide assets that address a user's need.

The NCP system addresses problem areas plaguing the ability to leverage technologies. Five of these problem areas include problems in policy, technology, deployment, timeliness and prediction.

The policy problem occurs when rules, laws or regulations obstruct deployment of these assets. For example, a user has a need to have certain radio equipment. Radio frequency technology has evolved to the point where dynamic use of broad spectrums can be leveraged by agile and cognitive radio approaches. The barrier to deployment of these concepts is that use of the spectrum is managed by law; and therefore, certain emerging technologies may violate the law. However, in order to get these laws changed, it must be proven empirically that the capabilities and mechanisms can and do exist so that new or modified policies can be written. This requires the ability to test communications capabilities in an operationally valid environment that is not held to the policies defined by law.

The technology problem stems from an inability to effectively transition technology into assets that a user can use. Generally, success of a technology stems from demonstrating its capabilities and proving it is viable. However, to the user, most technologies are not easily understood or appreciated for what they could provide to the user.

The deployment problem concerns an inability to provide users with operationally relevant assets. For example, assets may be developed and tested and ready for use by the user that offer significant improvements to the user but are instead stored in a warehouse. One reason the assets are not being used is that the assets are being provided without proper training. Another reason is that the assets, although good in and of themselves, are found after the fact to be incompatible with existing infrastructures. A further reason for not employing these new technologies in an operational arena (e.g., in a military or civilian environment) is that there is assessment from management that either deems that implementing the improvement is too risky due to the severity of the outcome or from an inability by the user to assess the improvement deploying the assets offers.

The timeliness problem is an inability to provide relevant technology in a timely manner. For example, technologies may be developed at a faster rate than the deployment cycle thereby making the new technologies obsolete at the time of deployment. Since the RDT&E, acquisition and training processes are presently stove-piped processes, the total cycle can be even longer between the discoveries of technologies that can fill the user's needs to when those technologies are generally available to the user.

The prediction problem involves an inability to effectively integrate and transition the pure modeling and simulation domain through the operational domain in order to provide a seamless transition of operational improvements. Modeling and simulation by itself provides great insight, but models require empirical validation and exercised before they can be trusted. Thus, the ability to transition modeled and predicted effects is important to the effective, efficient, and timely development and deployment of relevant technologies and appropriate and relevant training.

To address these problems, the NCP system is used as a common test bed framework to be used for integrated technology research, development, evaluation, and deployment. As a test bed, the NCP system provides for test management, test observation and witnessing, stimulation and monitoring of the tested capabilities, information capture and retention relevant to the test, and information analysis of the test execution similar to the basic functions of any test system. Many of these same witnessing characteristics of a test system are formally required by the traditionally separate acquisition system in which the only difference is independence of analysis. One role of an acquisition system is to compare observations against system, component, and part specifications and regulations to validate operational compliance. One important difference in the NCP system is the embedment of the test bed into a training environment, which provides a number of advantages. One advantage is that synergistic leveraging of measurement capabilities that both test and training need and use, to include personnel tracking, scenario coordination management and execution through stimulus, monitoring, data recording, observation and witnessing, and after action review and analysis.

The operations orientation of the test bed is also accomplished by embedding the RDT&E process into the training process. The training process, continually aligned with current operational mission needs, stimulates and measures the people part of a system's capabilities thereby improving performance by increasing personnel skills. The complex operational environments of stressed situations are effectively driven by the training process in order to provide skills that meet the mission and operational needs of the nation. Technology insertion uses the basic components and process flow but holds the people part of the equation nearly constant while empirically inserting and migrating the technology of the systems being used by people. This provides an operational validation of not only technology improvements but the application and use of that technology to the best benefit of the user. The results of these tests can benefit not only the next changes to be considered in technology but also creates a feedback mechanism into the training processes to help migrate operations strategies and Tactics, Techniques, and Procedures (TTPs). By combining these two processes within the NCP system, the traditional "design of experiments" can be applied to the large groups of personnel being trained to effectively evaluate technologies and the inverse impact of technologies on training.

In one example, the NCP system may be used in an urban environment. For example, the urban environment focus provides the setting for addressing the continuum of operational domains challenging the various user communities, with needs being addressed from a home front civil peace keeping and a law enforcement/first response through homeland security, civil support, homeland defense, up through foreign force projection and stabilization activities. All of these require complex emersion types of solution validation mechanisms exercising not only the front line responders and war fighters, but also echelons of command up through local, state, national, and international levels. Testing of potential solutions as well as acquisition validation in these complex environments is necessary to understand the benefit or mission assurance aspects of any solution being considered for fielding.

In one example, the NCP system is networked and includes a distributed architecture. The networked nature of the NCP system capitalizes on the exploitation of existing distributed capabilities by providing mechanisms for abstracting the test and training infrastructures across nodes. These mechanisms include: a meta-framework for networking across multiple network structures; organizational and business relationships and models for interacting, sharing, and operating; and neutral party consortiums which provide sovereignty and user/ supplier coordination thereby preserving open access for Federal, civil, academic, and industrial communities. The distributed approach allows remote participation, even to the point of virtualization, to support solution systems that are network oriented or network-centric in nature. The distributed nature of the NCP system provides the ability to enact and measure true force-on-force, multi-echelon and multi-organization level exercises which can then be used to test and evaluate potential or conceptual complex technology based solutions. Another benefit is the reduction of overall cost since services can be accessed over the distributed infrastructure that presently need to be physically co-resident at the training or testing sites.

Referring to FIG. 1, in one example, the NCP system is an NCP system 10. The NCP system 10 includes an asset 12, sensors 16, injectors 22, observer ports 26 and processing systems 32 that are connected by a network 36. In one example, the network 36 includes at least one of a satellite, local area network or a wide area network or any combination thereof.

The asset 12 may be a product, system, equipment and so forth that is evaluated to determine if it is suitable to meet a user's need. The sensors 16 may include for example, infrared sensors, cameras, radar and so forth that observe the asset 12 and personnel interacting with the asset, for example, in a training exercise. In one example, the sensors 16 may include at least one of a radio frequency (RF) spectrum usage sensor, a radio frequency identification (RFID) system, a Deployable Force-on-Force Instrumented Range System (DFIRST™) individual position locator or video imaging.

The injectors 22 provide real-world and or virtual-world data to the NCP system 10 in a form of test data. The data from the injectors may interact directly with the asset 12 or indirectly with the asset through personnel using the asset. In one example, an injector may be a system stimulator (SISTIM) virtual unit messaging emulator.

The observer ports 26 allow observers, both analysts and safety monitors, to observe the testing environment in which the asset is being used without physically being there, which may disrupt the operations and training. In one example, the observer ports 26 are personal computers (PCs). The processing systems 32 process and coordinate the flow of data amongst the sensors 16, the injectors 22 and the observer ports 26. This information is changed form the sources format into a neutral data format for effective and efficient transfer and then changed into the destination format upon delivery. In some examples, depending on the particular asset, the processing systems 32 control and coordinate the flow of data from the asset 12 if the asset is directly connected to the network 36 as shown in FIG. 1. In other examples, the asset 12 may not be directly connected to the network 36 (not shown).

Figure 2:
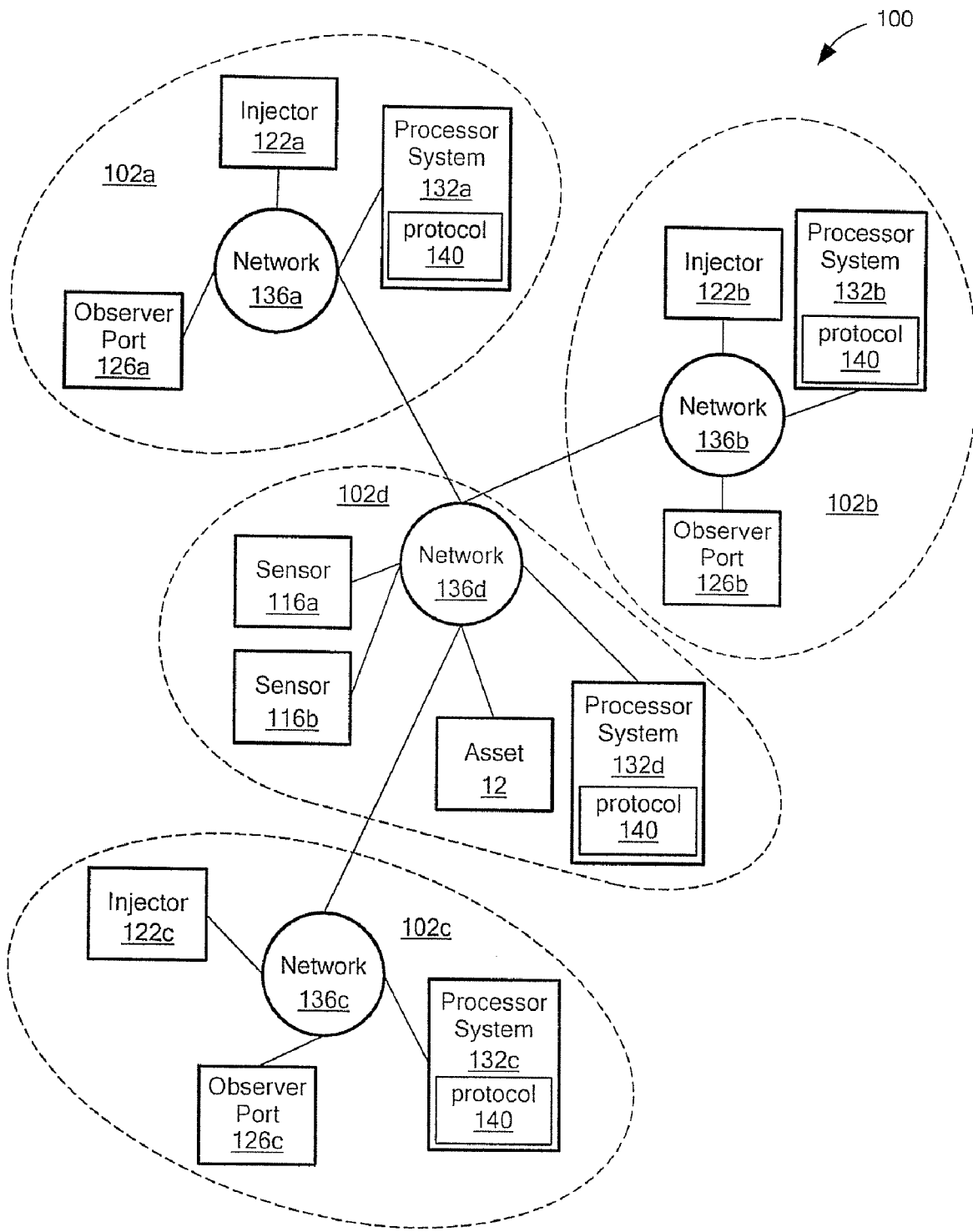
FIG. 2 is a block diagram of an example of the NCP system of FIG. 1.

Referring to FIG. 2, one example of the NCP system 10 is an NCP system 100 that includes a distributed architecture. The NCP system 100 includes four components (e.g., a first component 102a, a second component 102b, a third component 102c and a fourth component 102d). These components 102a-102d may be collocated or separated by many miles (e.g., thousand of miles). The components 102a-102d may represent a particular function. For example, the component 102b represents an RDT&E system, the component 102b represents a training system and the component 102c represents an acquisition system. The component 102d represents the testing environment where the asset 12 operates. In some examples, each component 102a-102d is run by a separate type of organization (e.g., city organizations, state organizations, federal organizations, international organizations, academic organizations, commercial organizations or any combination thereof).

The component 102a includes an injector 122a, an observer port 126a and a processing system 132a that are connected by a network 136a. The component 102b includes an injector 122b, an observer port 126b and a processing system 132b that are connected by a network 136b. The component 102c includes an injector 122c, an observer port 126c and a processing system 132c that are connected by a network 136b. The component 102d includes the asset 12, a sensor 116a, a sensor 116b, a processor system 132d connected by the network 136d. The network 136d is connected to the networks 136a-136c. In this particular example, the sensor 116a is used by the component 102a and the sensor 116b is used by the component 102b. In one example, the component 102c shares the sensor 116a with the component 102a. In one example, the sensors 116a-116b correspond to the sensors 16, the injectors 122a-122c correspond to the injectors 22, the observer ports 126a-126c correspond to the observer ports 26 and the processor systems 132a-132d correspond to the processor systems 32.

Because each of the components 102a-102d may be diverse systems, the NCP system 100 executes a common protocol 140 to facilitate communications amongst the components 102a-102d. In one example, each of the processing systems 132a-132d stores the protocol 140.

Figure 3:
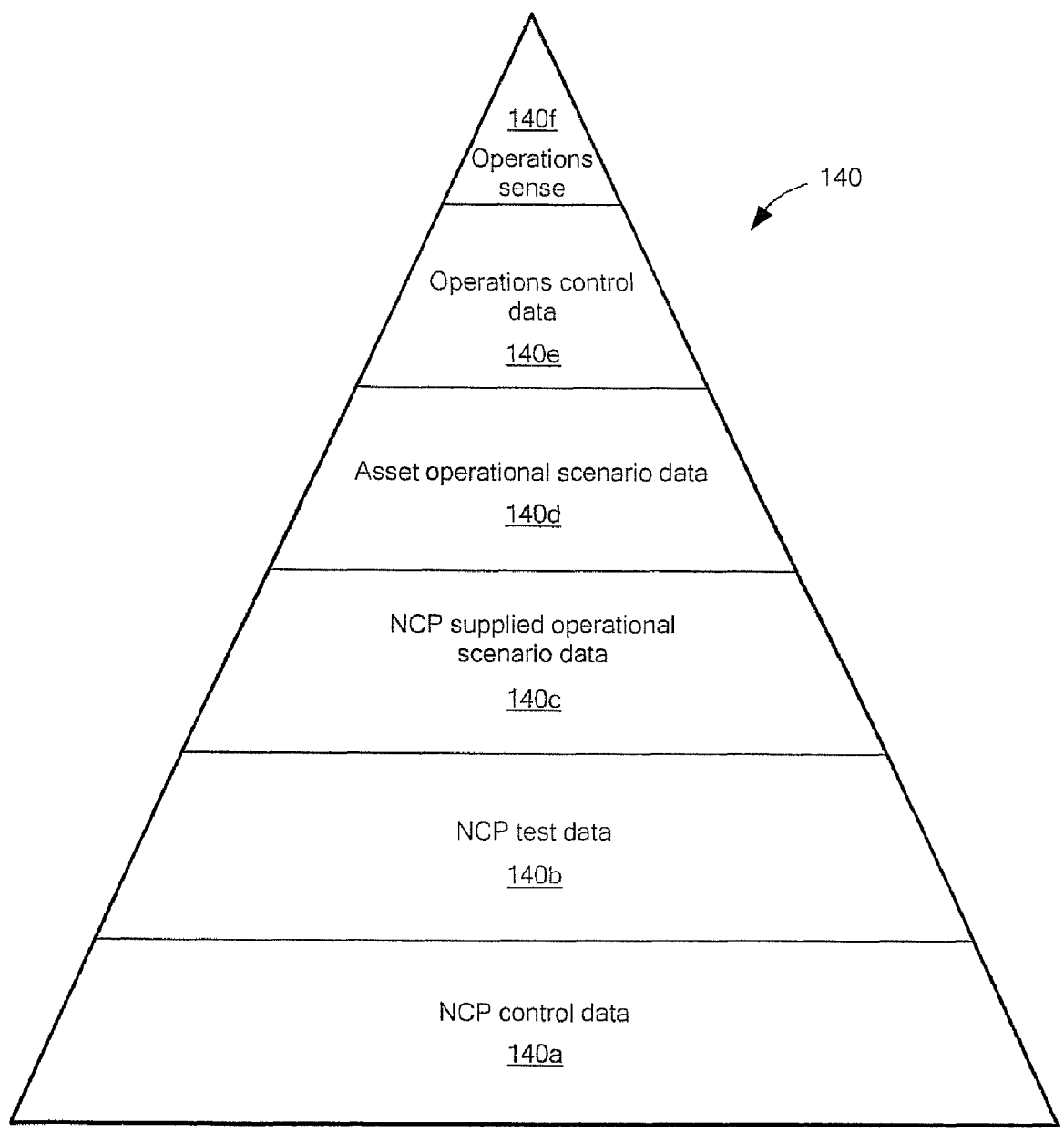
FIG. 3 is a flowchart of an example of a process to perform network-centric processing.

Referring to FIG. 3, the protocol 140 includes at least six separately managed information flows or sub-protocols. For example, the protocol 140 includes NCP control data 140a; NCP test data 140b; NCP supplied operational scenario data 140c; asset operational scenario data 140d; operations control data 140e; and operations sense data 140f. Each information flow 140a-140f is managed for access authorization and role by NCP system users. NCP control data 140a, NCP test data 140b and NCP supplied operational scenario data 140c support NCP distributed node interactions and synchronization. Asset operational scenario data 140d; operations control data 140e; and operations sense data 140f support NCP visibility into the internal information flows of the asset 12 being evaluated.

NCP control data 140a includes information channelization and data fields that support the exchange of the following types of information between collaborative nodes supporting simultaneous user scenarios and events: command messages (e.g., verbal, digital, analog and so forth); environmental stimulus control messages (e.g., cueing information, control of emulations of virtual units, control of emulations of real environments such as RF noise or spectrum usage, control of video streams; and control of data streams and so forth); and inter-node collaboration of distributed nodes. In one example, the nodes refers to the components 102a-102d.

NCP test data 140b includes information channelization and data fields to define, identify, distribute, capture, store, catalog, retrieve, and replay the test and exercise and control data generated for each user event.

NCP supplied operational scenario data 140c includes information channelization and data fields to define, coordinate, identify, distribute, capture, store, catalog, retrieve, and replay the scenario information used at each and across the distributed nodes of the NCP system 10.

Asset operational scenario data 140d includes information channelization and data fields to identify, capture, store, catalog, and retrieve scenario information that is part of the asset 12 being trained, tested, or otherwise evaluated.

Operations control data 140e includes information channelization and data fields to identify, capture, store, catalog, and retrieve control information that is part of the asset 12 being trained, tested, or otherwise evaluated.

Operations sense data 140f includes information channelization and data fields to identify, capture, store, catalog, and retrieve the sensor side information, or system perceived input information that is part of the asset 12 being trained, tested, or otherwise evaluated.

In one example, the NCP system 10 may be used to perform training with the asset 12 by using procedures that personnel are going to use in the real-world environment with its anticipated variables. Throughout training, the shortfalls are identified and analyzed. This includes the evaluation of necessary skills, equipment shortfalls, and TTPs. Shortfalls are also addressed and minimized with quick-reaction solutions focused on the user's needs. For skill shortfalls, training regimens are modified. For equipment shortfalls, cooperative RDT&E and acquisition functions can provide quick-reaction solutions that are documented appropriately to provide full deployment improvements to subsequent equipment deployments. For TTP shortfalls, improved tactics, techniques, procedures, strategies, guidance, and other doctrine are developed and deployed for personnel use. The improvements are revalidated during operational training exercises by the personnel that are using them in the mission during the remaining training activities. Thus, the personnel using the asset 12 can execute the mission with the equipment, skills, and TTPs they used in training.

Figure 4:
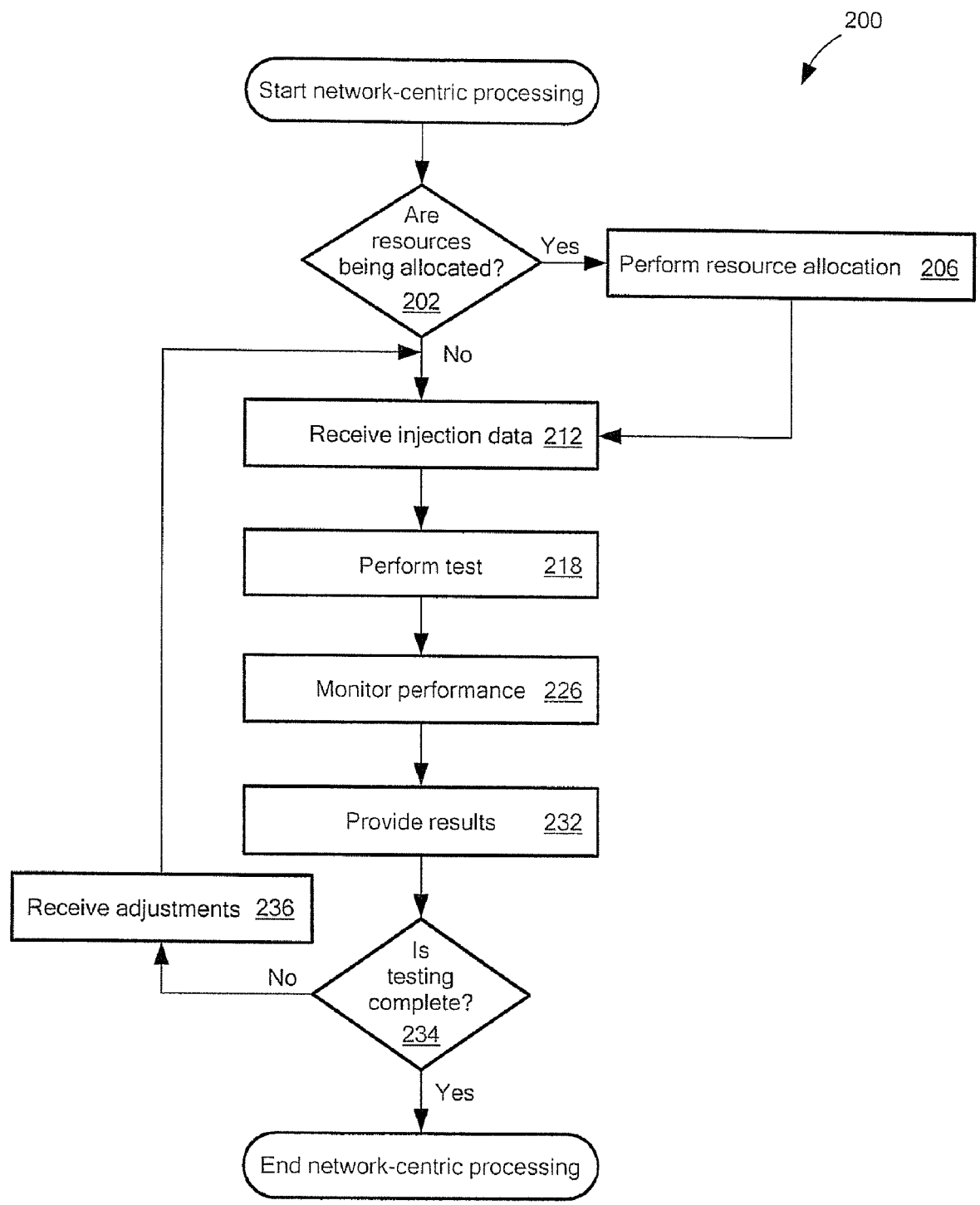
FIG. 4 is a diagram depicting a protocol used in the NCP system.

Referring to FIG. 4, an example of a network-centric processing is a process 200. NCP system 10 determines if resources (e.g., sensors 16) need to be allocated (202). If allocation is needed, an allocation process is performed (206) such as a process 300, for example. Data from the injectors 22 is provided to the asset 12 (212) and testing is performed on the asset (218). Performance of the testing on the asset 12 and the training of the personnel are monitored (226). For example, the sensors 16 monitor the asset 12 and the personnel. The results of the monitoring are provided to the observers (232). For example, the results are provided to the observers through the observer ports 26. The observers can then make adjustments to the training, RDT&E and acquisition processes. If the testing is not complete (234), the NCP system 10 receives adjustments made as a result of the observations (236) and the testing and training is performed again.

Figure 5:
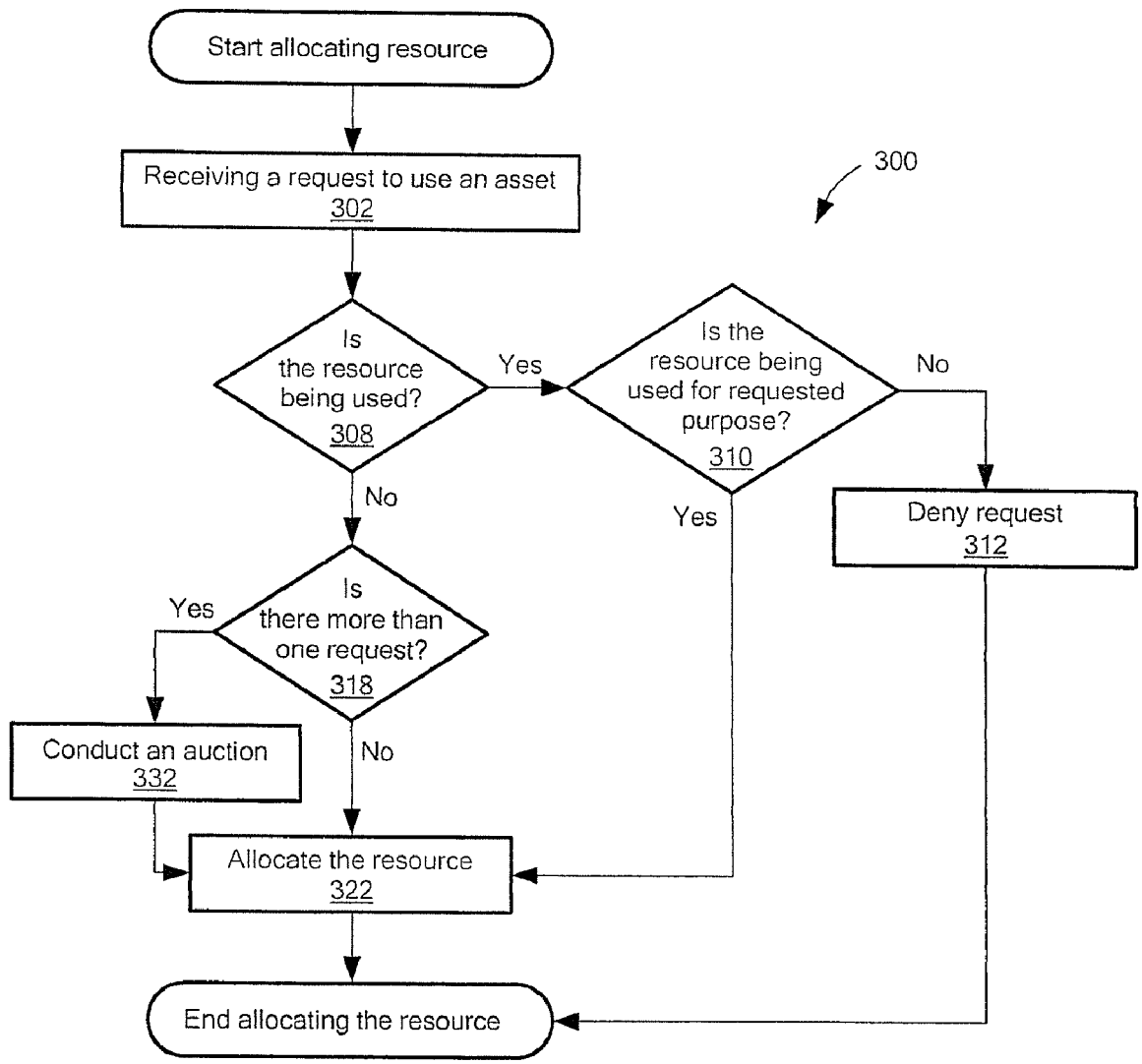
FIG. 5 is a flowchart of an example of a process to perform resource allocating in the network-centric processing.

Referring to FIG. 5, one of the advantages of using the NCP system 10 is a mechanism to share and allocate resources (e.g., sensors 16). One example of a process to allocate a resource is a process 300. A request is received to allocate a resource (302). For example, the processor system 132a receives a request from the processor system 132c to share the sensor 116a. NCP system 10 determines whether the resource is being used (308). For example, the processor system 126a determines if the sensor 116a is being used. If the resource is being used, the NCP system 10 determines if the resource is being used as requested (310). For example, if a sensor 16 is being used to measure infrared in a particular area, then a request to measure infrared within the same area would have the same purpose. However, if the request specifies a different area to measure infrared data than what the sensor can presently measure, then the request has a different purpose. If the request has a different purpose the request is denied (312). If the request has the same purpose, the resource is allocated in a sharing arrangement (322). Allocation of resources includes time period of allocation.

If the resource is not being used, the NCP system 10 determines if there is more than one request pending to use the resource (318). For example, the processor system 126a determines if any other component (such as the component 126b, for example) is also making a request. If no other request is received, NCP system 10 allocates the resource. For example, the processor system 126a allocates use of the sensor 116a to the component 126c. In one example, the allocation is subject to a credit/debit transaction.

If there is more than one request, the NCP system 10 conducts an auction to determine allocation (332). For example, component 102b and component 102c are requesting use of the sensor 116a for different purposes. An auction is conducted to determine the component that gets the allocation. The auction process may use many different allocation criteria to determine who gains access the resource. The criteria may be based on mission need, a credit/debit system, priority and so forth. The winner of the auction process is allocated the resource (322).

Figure 6:
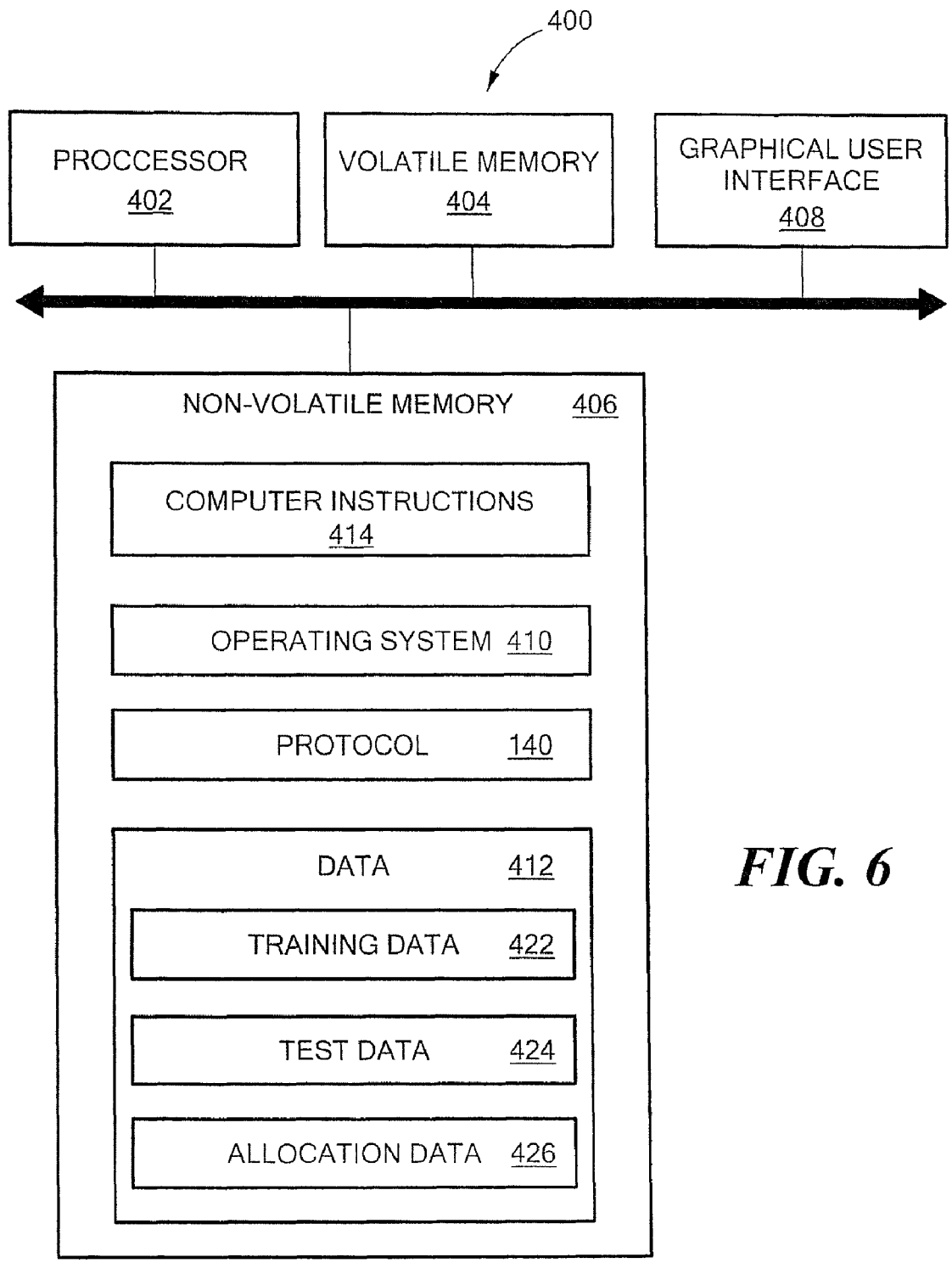
FIG. 6 is a block diagram of a computer used to implement the processes of FIGS. 4 and 5.

Referring to FIG. 6, an example of one of the processor systems 32 is a processor system 400. The processor system 400 includes a processor 402, a volatile memory 404, a non-volatile memory 406 (e.g., hard disk), a graphical user interface (GUI) 408 (e.g., a mouse, a keyboard, a display, for example). The non-volatile memory 406 stores the protocol 140, computer instructions 414, an operating system 416 and data 412 including training data 422, test data 424 and allocation data 426 (e.g., allocation criteria, debit/credit data for use by a debit/credit system and so forth). In one example, the computer instructions 414 are executed by the processor 402 out of volatile memory 404 to perform all or part of the process 200 and/or the process 300.

The processes described herein (e.g., processes 200 and 300) are not limited to use with the hardware and software of FIG. 6; they may find applicability in any computing or processing environment and with any type of machine or set of machines that is capable of running a computer program. These processes may also be applied to the allocation of facilities and personnel. The processes may be implemented in hardware, software, or a combination of the two. The processes may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform the processes and to generate output information.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform process 200 and/or process 300. The processes may also be implemented as a machine-readable storage medium, configured with a computer program, where upon execution, instructions in the computer program cause the computer to operate in accordance with the respective process.

The processes described herein are not limited to the specific embodiments described. For example, the processes 200 and 300 are not limited to the specific processing order of FIGS. 4 and 5, respectively. Rather, any of the processing blocks of FIGS. 4 and 5 may be re-ordered, combined or removed, performed in parallel or in serial, as necessary, to achieve the results set forth above.

The processing blocks in FIGS. 4 and 5 associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Elements of different embodiments described herein may be combined to form other embodiments not specifically set forth above. Other embodiments not specifically described herein are also within the scope of the following claims.

What is claimed is:

1. A network-centric processing (NCP) system, comprising:
   sensors configured to monitor activities associated with testing of a non-human asset;
   a first system configured to provide the testing on the non-human asset;
   a second system configured to provide training of personnel using the non-human asset;
   a third system configured to record problems associated with the testing and the training of the non-human asset as input for an acquisition process;
   a network connecting the first system, the second system, the third system and the sensors; and
   a protocol used by the first system, the second system and the third system to facilitate communications, the protocol comprising a first portion to support distributed node interactions and synchronization and a second portion to support visibility into the internal information flows of the non-human asset.

2. The NCP system of claim 1 wherein the first system is configured to provide data to support a research, development, test and evaluation (RDT&E) process.

3. The NCP system of claim 1, further comprising an injector configured to provide test data to the NCP system.

4. The NCP system of claim 1 wherein the sensor is one of:
   a radio frequency (RF) spectrum usage sensor;
   an infrared sensor;

a radar;
a radio frequency identification (RFID) system;
a satellite;
a Deployable Force-on-Force Instrumented Range System (DFIRST™) individual position locator; or
a camera.

5. The NCP system of claim 1 wherein a first sensor of the sensors is assigned to one of the first system, the second system or the third system; and
wherein the first sensor is shared by another system than the one assigned system through an allocation process.

6. The NCP system of claim 5, wherein the allocation process is an auction process.

7. A method of network centric processing, comprising:
processing data from sensors configured to monitor activities associated with testing of a non-human asset,
processing data from a first system configured to provide the testing on the non-human asset;
processing data from a second system configured to provide training of personnel using the non-human asset;
processing data from a third system configured to record problems associated with the testing and the training of the non-human asset as input for an acquisition process; and
processing the data using a protocol used by the first system, the second system and the third system to facilitate communications,
wherein the protocol comprising a first portion to support distributed node interactions and synchronization and a second portion to support visibility into the internal information flows of the non-human asset, and
wherein a network connects the first system, the second system, the third system and the sensors.

8. The method of claim 7 wherein processing data from a first system configured to provide the testing on the asset comprises processing data to support a research, development, test and evaluation (RDT&E) process.

9. The method of claim 7, further comprising processing data from an injector configured to provide test data to the NCP system.

10. The method of claim 7 wherein processing data from sensors comprises processing data from sensors comprising at least one:
a radio frequency (RF) spectrum usage sensor;
an infrared sensor;
a radar;
a radio frequency identification (RFID) system;
a satellite;
a Deployable Force-on-Force Instrumented Range System (DFIRST™) individual position locator; or
a camera.

11. The method of claim 7 wherein a first sensor of the sensors is assigned to one of the first system, the second system or the third system; and
further comprising performing an allocation process to determine whether the sensor may be shared with another system than the one assigned.

12. The NCP system of claim 11, wherein performing an allocation process comprises performing an auction process.

13. An article comprising:
a non-transitory machine-readable medium that stores executable instructions to provide a network-centric process, the instructions causing a machine to:
process data from sensors configured to monitor activities associated with testing of a non-human asset,
process data from a first system configured to provide the testing on the non-human asset;
process data from a second system configured to provide training of personnel using the non-human asset;
process data from a third system configured to record problems associated with the testing and the training of the non-human asset as input for an acquisition process; and
process the data using a protocol used by the first system, the second system and the third system to facilitate communications,
wherein the protocol comprises a first portion to support distributed node interactions and synchronization and a second portion to support visibility into the internal information flows of the non-human asset, and
wherein a network connects the first system, the second system, the third system and the sensors.

14. The article of claim 13 wherein instructions causing a machine to process data from a first system configured to provide the testing on the asset comprises instructions causing a machine to process data to support a research, development, test and evaluation (RDT&E) process.

15. The article of claim 13, further comprising instructions causing a machine to process data from an injector configured to provide test data to the NCP system.

16. The article of claim 13 wherein instructions causing a machine to process data from sensors comprises instructions causing a machine to process data from sensors comprising at least one:
a radio frequency (RF) spectrum usage sensor;
an infrared sensor;
a radar;
a radio frequency identification (RFID) system;
a satellite;
a Deployable Force-on-Force Instrumented Range System (DFIRST™) individual position locator; or
a camera.

17. The method of claim 13 wherein a first sensor of the sensors is assigned to one of the first system, the second system or the third system; and
further comprising instructions causing a machine to perform an allocation process to determine whether the first sensor may be shared with another system than the one assigned,
wherein instructions causing a machine to perform an allocation process comprises instructions causing a machine to perform an auction process.

* * * * *